(12) United States Patent
Kim et al.

(10) Patent No.: US 12,468,137 B2
(45) Date of Patent: Nov. 11, 2025

(54) APPARATUS FOR HOMEOTHERMIC MANIPULATION OF LIVE ANIMAL FOR MICROSCOPIC IMAGING OF INTERNAL TISSUE

(71) Applicants: KOREA ADVANCED INSTITUTE OF SCIENCE AND TECHNOLOGY, Daejeon (KR); IVIM Technology, Inc., Daejeon (KR)

(72) Inventors: Pilhan Kim, Daejeon (KR); Yoonha Hwang, Daejeon (KR); Eunjoo Song, Daejeon (KR)

(73) Assignees: KOREA ADVANCED INSTITUTE OF SCIENCE AND TECHNOLOGY, Daejeon (KR); IVIM Technology, Inc., Daejeon (KR)

( * ) Notice: Subject to any disclaimer, the term of this patent is extended or adjusted under 35 U.S.C. 154(b) by 609 days.

(21) Appl. No.: 17/887,336

(22) Filed: Aug. 12, 2022

(65) Prior Publication Data

US 2023/0052607 A1     Feb. 16, 2023

(30) Foreign Application Priority Data

Aug. 13, 2021  (KR) .................. 10-2021-0107411

(51) Int. Cl.
*A61B 5/01* (2006.01)
*A61B 5/00* (2006.01)
(Continued)

(52) U.S. Cl.
CPC ............ *G02B 21/0076* (2013.01); *A61B 5/01* (2013.01); *A61B 5/702* (2013.01); *A61F 7/007* (2013.01);
(Continued)

(58) Field of Classification Search
CPC ............ A61B 2503/40; A61B 2503/42; A61B 2562/0271; A61B 5/01; A61B 5/702;
(Continued)

(56) References Cited

U.S. PATENT DOCUMENTS

2011/0071388 A1   3/2011   Yared et al.
2021/0033840 A1   2/2021   Roggenbuck et al.

FOREIGN PATENT DOCUMENTS

CN      111419181 A    7/2020
CN      115887054 A    4/2023
(Continued)

OTHER PUBLICATIONS

Extended European Search report corresponding to patent application No. 22189267.2 dated Jan. 31, 2023.
(Continued)

*Primary Examiner* — Mark D Remaly
(74) *Attorney, Agent, or Firm* — Jenkins, Taylor & Hunt, P.A.

(57) ABSTRACT

The present invention relates to a fixation and body temperature maintaining apparatus for fixing a small animal in order to generate a high-resolution micro image of a predetermined tissue of the small animal within a biomicroscope with an object lens, which includes: a plate heater with a heat wire installed therein, on which the small animal is enabled to be directly placed; a glass heater holder fixed to a hole of the plate heater; and a glass heater fixed to the glass heater holder, and located above the tissue of the small animal and maintaining flatness of the tissue, and increasing a temperature of the tissue itself, in which a cover glass serving to adjust a refractive index of the object lens and a heat wire heater are integrally formed. In an embodiment of the
(Continued)

present invention, a body temperature of a live small animal which is an object to be observed with a biomicroscope is maintained to be constant.

7 Claims, 11 Drawing Sheets

(51) Int. Cl.
*A61F 7/00* (2006.01)
*A61F 7/08* (2006.01)
*G02B 21/00* (2006.01)
*G02B 23/24* (2006.01)

(52) U.S. Cl.
CPC ............ *A61F 7/08* (2013.01); *A61B 2503/40* (2013.01); *A61B 2503/42* (2013.01); *A61B 2562/0271* (2013.01); *A61F 2007/0093* (2013.01); *G02B 23/243* (2013.01)

(58) Field of Classification Search
CPC ... A61D 3/00; A61F 2007/0093; A61F 7/007; A61F 7/08; G02B 21/0076; G02B 21/26; G02B 21/30; G02B 23/243
See application file for complete search history.

(56) References Cited

FOREIGN PATENT DOCUMENTS

| | | |
|---|---|---|
| EP | 1975671 A2 | 10/2008 |
| EP | 414151281 | 4/2024 |
| JP | 2017203896 A | 11/2017 |
| JP | 2020003527 A | 1/2020 |
| KR | 20230025188 A | 2/2023 |

OTHER PUBLICATIONS

Intention to Grant received in European Patent Application No. 22189267.2 mailed on Jan. 30, 2024, 42 pages.
Office Action received in Korean Patent Application No. 10-2021-0107411 mailed on Feb. 6, 2024, 10 pages. (Translation).

APPARATUS FOR HOMEOTHERMIC MANIPULATION OF LIVE ANIMAL FOR MICROSCOPIC IMAGING OF INTERNAL TISSUE

CROSS-REFERENCE TO RELATED APPLICATIONS

This application claims the priority of Korean Patent Application No. 10-2021-0107411, filed on Aug. 13, 2021, the disclosure of which is incorporated herein by reference in its entirety.

TECHNICAL FIELD

The present invention relates to bio imaging of a preclinical animal model, and particularly, to a fixation and body temperature maintaining apparatus to and from which various accessory devices are easily attachable and detachable, and fixes a live animal and maintains a body temperature of the live animal when imaging an internal tissue of the live animal in a bio microscope or an endoscopic microscope.

BACKGROUND

In general, a biomicroscope has been developed for the purpose of observing cells and molecule level phenomena that occur in a bio tissue of a living animal through imaging inside a living body.

The biomicroscope has characteristics of imaging inside the living body in which the imaging should be performed while the animal keeps alive. Due to the characteristics of the imaging, keeping a state of a small animal to be constant is very important to determine the reliability of the result. Among them, a most common and important factor is a body temperature of the animal. In most in vivo researches, an infrared heater requiring a separate installation space for keeping the body temperature, a rigid plate heater in which a body temperature feedback is impossible, or a soft silicon heater and a heating pad which are difficult to fix is utilized.

Further, exposing an organ to be imaged and effectively fixing the organ not to move due to characteristics of a biomicroscope having a short transmission depth is a required process in a step before the imaging. To this end, manufacturing and fixing a processed product according to an individual competence of a researcher than developing a special apparatus is a main approach type method.

In order to perform the in vivo imaging by the conventional approach method, a body temperature control device for keeping the body temperature of a small animal and a processed product and a stage for fixing the small animal should be separately provided and used. Therefore, a lot of trial and error are required according to the competence or experience of the individual researcher from selection to application of a product, and further, each part is not a standardized article which is individually used and is easily coupled to the biomicroscope, so tissue exposure is performed outside the biomicroscope, and then the animal is moved to a stage on which a body temperature controlling heating pad is put, and the imaging should be performed. In this case, fixation of the animal or the imaging tissue may be changed while the animal is moved to the stage.

In addition, when a conventional infrared heater is installed, a separate installation space is required. Meanwhile, a majority of commercial rigid plate heaters are types that keep a temperature of a plate itself, and most commercial rigid plate heaters have no function of adjusting a temperature through a body temperature feedback, and most of the contents that claim to be the feedback have a purpose of overheat prevention to keep the plate temperature within a predetermined range.

Further, the silicon heater and the heating pad are schemes which are primarily made of a soft material, and is fixed to a separately prepared stage by a Velcro or a tape, and used. When the heating pad is larger than the stage, the heating pad can be fixed by using the Velcro, etc., and in this case, it is difficult to flatten a surface on which the small animal is placed as a whole and an experimental animal can be placed only at a specific location, and the experimental animal is widely surrounded at the specific location of the stage, so a location capable of fixing a glass heater or another motion correction device is limited to a stage range, while the heating pad or the silicon heater smaller than the stage should be fixed by the tape, and there is a difference in fixation location every fixation.

As a result, development of a device capable of fixing a posture of the small animal and development of a stage system utilizing the development of the device is required to keep the temperature of the small animal at an appropriate level and maintain a desired tissue to be exposed.

DISCLOSURE

Technical Problem

The present disclosure is to provide a fixation and body temperature maintaining apparatus which maintains a body temperature of a live small animal which is an object to be observed with a biomicroscope to be constant.

The present disclosure is to provide a fixation and body temperature maintaining apparatus which stably fixes the small animal and easily observes the small animal.

The present disclosure is to provide a fixation and body temperature maintaining apparatus which can stably and conveniently perform high-resolution micro imaging while maintaining the homeostasis of various tissues of a live small animal by applying a sliding type stage for smoothly moving a sample plate to which the small animal is fixed to a focus region of a biomicroscope.

According to the present disclosure, a bottom surface on which the small animal is placed and is flat and a temperature of the bottom surface itself is adjusted through a body temperature feedback to maintain the body temperature of the small animal to be constant, and as can identified in an imaging result, an already optimized/standardized motion correction part can be coupled to a body temperature/imaging tissue maintaining part and used, and a plate heater which is taken out and can slide to an imaging focus location is used to expose and fix the imaging tissue immediately on the plate heater.

Technical Solution

A fixation and body temperature maintaining apparatus for fixing a small animal in order to generate a high-resolution micro image of a predetermined tissue of the small animal within a biomicroscope with an object lens according to an embodiment includes: a plate heater with a heat wire installed therein, on which the small animal is enabled to be directly placed; a glass heater holder fixed to a hole of the plate heater; and a glass heater fixed to the glass heater holder, and located above the tissue of the small animal and maintaining flatness of the tissue, and increasing a temperature of the tissue itself.

The glass heater comprises a cover glass serving to adjust a refractive index of the object lens, a glass holder fixing the cover glass, a glass holder cover, and a heat wire heater, and the glass holder and the heat wire heater are integrally formed, and the glass holder and the glass holder cover are enabled to be separated from each other and fixed by using a screw and a magnet.

The fixation and body temperature maintaining apparatus may further include: a tissue temperature sensor sensing the temperature of a biological tissue in the small animal; a body temperature sensor sensing a body temperature of the small animal; a plate temperature sensor measuring a current temperature of the plate heater; a glass temperature sensor measuring the current temperature of the glass heater; and a control device receiving outputs of the tissue temperature sensor, the body temperature sensor, the plate temperature sensor, and the glass temperature sensor, and driving the plate heater so that the current temperature of the body temperature sensor reaches a maintenance target body temperature, and driving the glass heater so that the tissue temperature becomes a target tissue temperature.

Since the body temperature/homeostasis may be maintained through the feedback only when there is a temperature sensor, the temperature sensor is a basic required component.

The heater wire may be installed at a center of the plate heater, and holes with threads of an equal interval for installing attached fixation mechanisms used for each of tissues to be imaged may be formed on both sides of the plate heater.

Detachable rails and bars may be installed on both sides of the plate heater.

The glass heater may be configured by coupling a block type heat wire heater and the glass holder, and the thread is disposed at one side of the glass holder to fix the glass heater by using the glass heater holder and a groove formed according to a size and a thickness of the cover glass is disposed at the other side of the glass holder, and a glass heater cover fixing the cover glass is covered based on a magnet or a screw to fix the cover glass to the inside of the glass holder.

The fixation and body temperature maintaining apparatus may further include a 3-axis stage upper plate, and the sliding plate holder capable of detachably fixing a body temperature maintaining and fixing mechanism may be coupled to the 3-axis stage upper plate.

The plate heater is fixed to a sliding plate holder with the rail to be slid and taken out to the outside of the stage.

Advantageous Effects

In an embodiment of the present invention, a body temperature of a live small animal which is an object to be observed with a biomicroscope is maintained to be constant.

Further, in an embodiment of the present invention, the small animal is stably fixed and the small animal is easily observed.

Further, in an embodiment of the present invention, it is possible to stably and conveniently perform high-resolution micro imaging while maintaining the homeostasis of various tissues of a live small animal by applying a sliding type stage for smoothly moving a sample plate to which the small animal is fixed to a focus region of a biomicroscope.

Further, in an embodiment of the present invention, the apparatus includes a device that maintains the body temperature of the small animal, and exposes an organ by fixing the small animal and a tissue, and a stage upper plate capable of moving the corresponding device to a microscope focus region to maintain the homeostasis of an animal model and more easily access internal and external organs, thereby enhancing user accessibility to in vivo imaging. That is, an in vivo imaging environment of which an individual existing researcher takes charge is constructed in terms of hardware/software, so micro imaging for various tissues of the small animal can be effectively utilized for a research that identifies various disease or biological phenomena which occur in the animal model.

MODES FOR THE INVENTION

In the following detailed description, only certain exemplary embodiments of the present invention have been shown and described, simply by way of illustration. However, the present invention may be modified in various different ways, all without departing from the spirit or scope of the present invention. In addition, in the drawings, in order to clearly describe the present invention, a part not related to the description is not omitted and like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Figure 1:
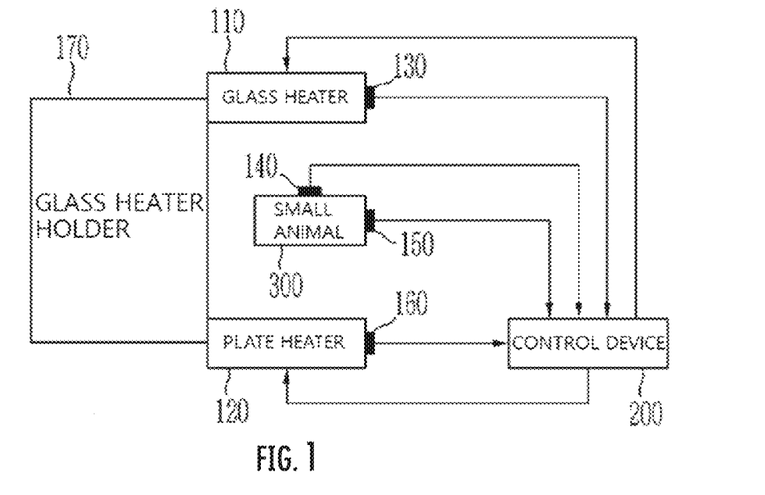
FIG. 1 is a block diagram illustrating a fixation and body temperature maintaining apparatus according to an embodiment of the present invention.

FIG. 1 is a block diagram illustrating a fixation and body temperature maintaining apparatus (of a living body of a biomicroscope) according to an embodiment of the present invention.

Referring to FIG. 1, the fixation and body temperature maintaining apparatus 10 is an apparatus for fixing a small animal 300, and for living body fixation and body temperature maintaining, in order to acquire a high-resolution image of an in vivo tissue of a small animal based on a biomicroscope.

The fixation and body temperature maintaining apparatus 10 may be coupled to a microscope apparatus (not illustrated), and in order to generate a high-resolution micro image of a predetermined tissue of the small animal 300 by using the same, the fixation and body temperature maintaining apparatus 10 may include a glass heater 110, a plate heater 120, a glass temperature sensor 130, an tissue temperature sensor 140, a body temperature sensor 150, a plate temperature sensor 160, a glass heater holder 170, and a control device 200.

The glass heater 110 may be fixed to the glass heater holder 170, a cover glass 111 serving to adjust a refractive index of an object lens and a heat wire 113 may be integrally formed, and the cover glass 111 and the heat wire 113 are located on the bio tissue of the small animal 300 to maintain flatness of the tissue and increase a temperature of the tissue itself.

The small animal 300 may be directly placed on the plate heater 120, and the heat wire 121 is installed to control the temperature. The heat wire 121 is installed at a center of the plate heater 120 to control the temperature. Holes 122 having threads formed at an equal interval for installing attached fixation mechanisms used for each tissue to be imaged may be disposed on both sides of the plate heater 120 at an equal interval. A rail 123 and a bar detachable to the holes 124 may be installed and fixed on both sides of the plate heater 120.

As necessary, an attached fixation mechanism/glass heater holder fixation hole 122 and a rail/bar fixing hole 124 may be formed to have different specifications.

The glass temperature sensor 130 senses and outputs the temperature of the glass heater 110.

The tissue temperature sensor 140 senses and outputs the temperature of the tissue.

The body temperature sensor 150 may sense and output a temperature in the rectum of the small animal 300, and use the sensed and output temperature as the body temperature.

The plate temperature sensor 160 measures and output a current temperature of the plate heater 120.

One side of the glass heater holder 170 may be fixed to the hole 122 of the plate heater 120, and the glass heater 110 may be fixed to an opposite side of the glass heater holder 170 by using a screw.

Figure 2:
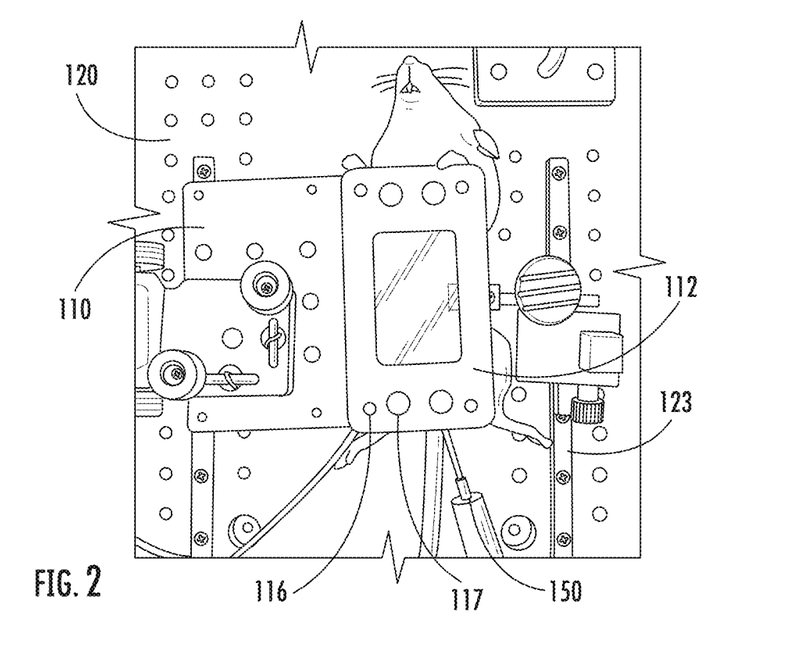
FIG. 2 is a photo illustrating the fixation and body temperature maintaining apparatus according to an embodiment of the present invention.

Referring to FIG. 1 or 2, the glass heater 110 may be configured by coupling a block type heat wire 113 and the glass holder 115, one side of the glass holder 115 may be fixed to the glass heater holder 170 by arranging the thread and a groove formed according to a size and a thickness of the cover glass 111 is arranged at the other side of the glass holder, and the glass holder cover 112 fixing the cover glass 111 is covered based on a magnet 117 or a screw 116 to fix the cover glass 111 to the inside of the glass holder.

A sliding plate holder device 180 includes a sliding plate holder 181, a stage upper plate 182, and a rail 183.

The plate heater 120 and the attached fixation mechanism may be detachably coupled to the sliding plate holder 181. The sliding plate holder 181 may be coupled to a 3-axis stage upper plate 182 by using the rail 183, and the sliding plate holder 181 may be slid and taken out to the outermost portion.

The control device 200 receives outputs of the glass temperature sensor 130 measuring the current temperature of the glass heater 110, the tissue temperature sensor 140, the body temperature sensor 150, and the plate temperature sensor 160, drives the plate heater 120 so that the current temperature of the body temperature sensor 150 reaches a maintained target body temperature, and drives the glass heater 110 so that a tissue temperature becomes a target tissue temperature.

Specifically, a feedback operation algorithm of software of the control device 200 is as follows.

A set parameter adjusted in a body temperature maintaining software of the control device 200 a maintained target body temperature (set value), a maintained target temperature (set value) of the glass heater 110, and a maximum set temperature (limit) of the plate heater 120.

The control device 200 automatically controls the temperature of the plate heater 120 in a range which does not exceed the maximum set temperature so that the current temperature of the body temperature sensor 150 reaches the maintained target body temperature. That is, when the temperature sensed by the body temperature sensor 150 is lower than the target body temperature, the body temperature is increased by driving the plate heater 120 and when the temperature sensed by the body temperature sensor 150 is equal to or higher than the target body temperature, the plate heater 120 is not driven.

Similarly, the control device 200 automatically controls the temperature so that the glass heater 110 which is in contact with a tissue sample maintains the target temperature. That is, when the temperature sensed by the tissue temperature sensor 140 is lower than the target tissue temperature, the body temperature is increased by driving the glass heater 110 and when the temperature sensed by the tissue temperature sensor 140 is equal to or higher than the target tissue temperature, the glass heater 110 is not driven.

Therefore, the glass heater 110 which is in contact with an upper portion of the fixed small animal 300 to be observed and the plate heater 120 which is in contact with a lower portion operate so as to maintain the small animal 300 at a constant temperature by the control of the control device 200 to acquire an image in a stable state in which the small animal 300 is maintained at the constant temperature.

The control device 200 may be one of a desktop computer, a notebook computer, or a tablet PC.

Referring to FIG. 2, the glass heater 110 is in contact with the stomach of the fixed small animal 300 to be observed, and the plate heater 120 is in contact with the back part of the small animal 300. In addition, the body temperature sensor 150 is manufactured as a rectal probe capable of stably measuring the body temperature of the small animal 300. During the experiment, as necessary, the tissue temperature sensor 140, the body temperature sensor 150, the plate temperature sensor 160 and the glass temperature sensor 130, the plate heater 120, and the glass heater 110 may be used singly or combinationally.

Figure 3:
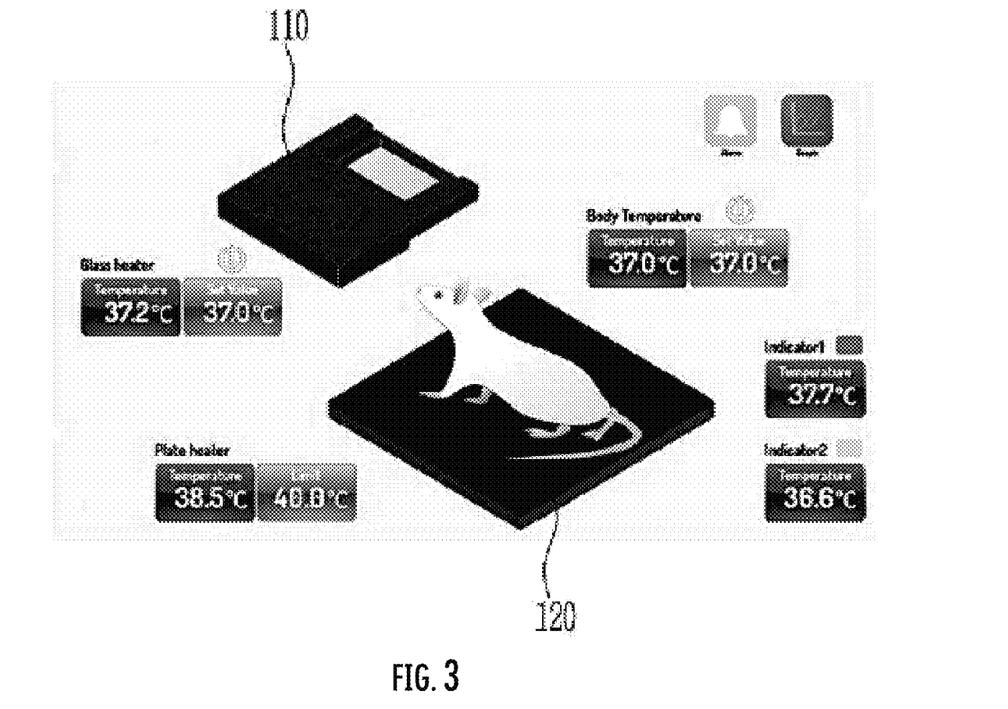
FIG. 3 is a diagram illustrating a body temperature maintaining concept of the fixation and body temperature maintaining apparatus according to an embodiment of the present invention.

Referring to FIG. 3, a temperature value continuously monitored in real time for controlling the maintenance of the body temperature is a current temperature of the plate heater 120, a current temperature of the body temperature sensor 150, a current temperature of the glass heater 110, current temperatures of the tissue temperature sensors (indicators 1 and 2) 140, etc.

The control device 200 performs a body temperature maintaining function by executing software which monitors and controls hardware of the plate heater 120, the glass heater 110, the body temperature sensor 150, and the tissue temperature sensor (indicators 1 and 2) 140, and heaters and sensors.

Referring to FIG. 3, for example, the current temperature of the plate heater 120 is 38.5° C. and the limit is 40° C. The current temperature of the body temperature sensor 150 is 37° C. and a set temperature is 37° C. The current temperature of the glass heater 110 is 37.2° C. and the set temperature is 37° C. In addition, the temperature of indicator 1 is 36.7° C. and the temperature of indicator 2 is 36.6° C. Here, indicator 1 and indicator 2 as examples of the tissue temperature sensors may be implemented as one or two or more numbers.

The feedback operation algorithm of the software of the control device 200 is as follows.

The control device 200 automatically controls the temperature of the plate heater 120 in a range which does not exceed the maximum set temperature so that the current temperature of the body temperature sensor 150 reaches the maintained target body temperature. That is, when the temperature sensed by the body temperature sensor 150 is lower than the target body temperature, the body temperature is increased by driving the plate heater 120 and when temperature sensed by the body temperature sensor 150 is equal to or higher than the target body temperature, the plate heater 120 is not driven.

The tissue temperature sensors 140 are independently used to monitor and record a temperature of a specific portion tissue during the experiment separately from the algorithm.

Figure 4:
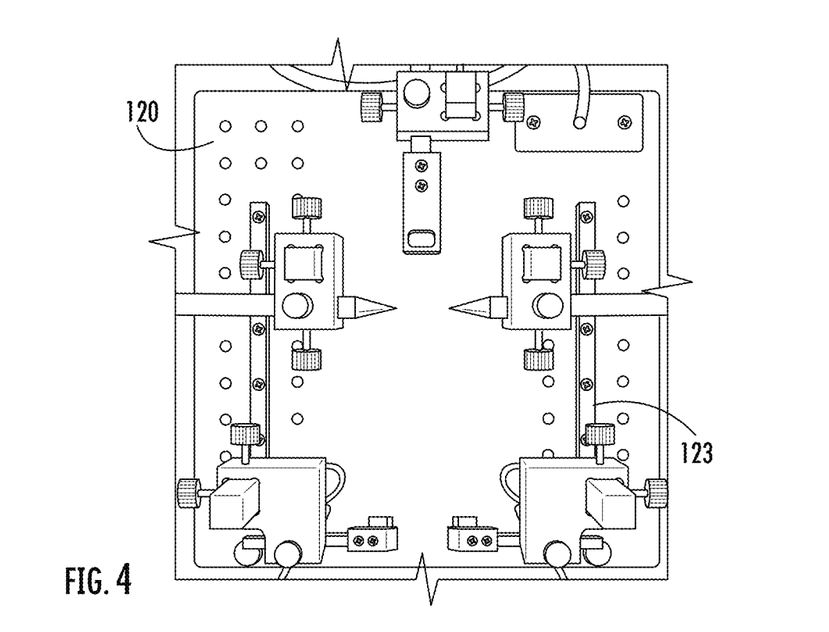
FIGS. 4 to 6 are diagrams illustrating photos of a plate heater and a mechanism in the fixation and body temperature maintaining apparatus according to an embodiment of the present invention.
Figure 5:
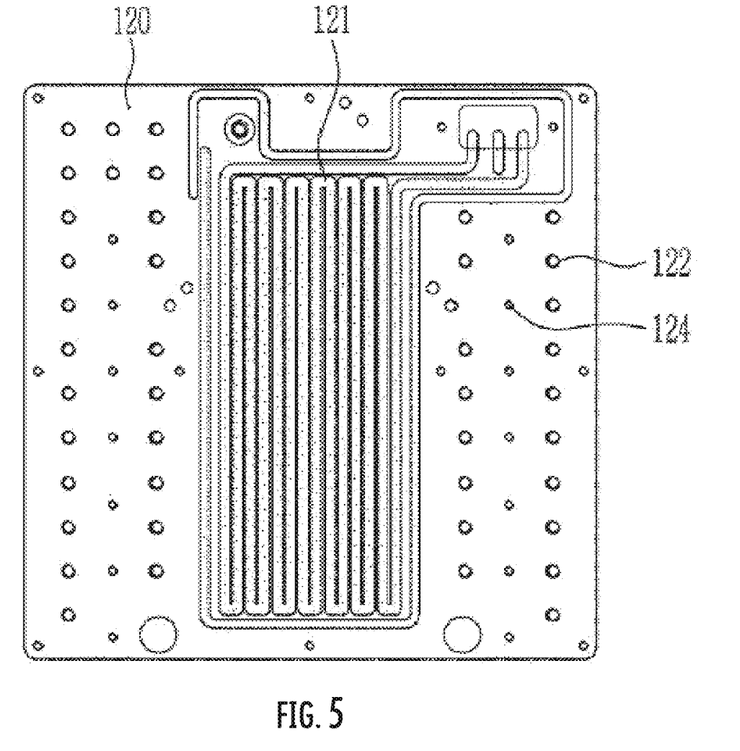
Figure 6:
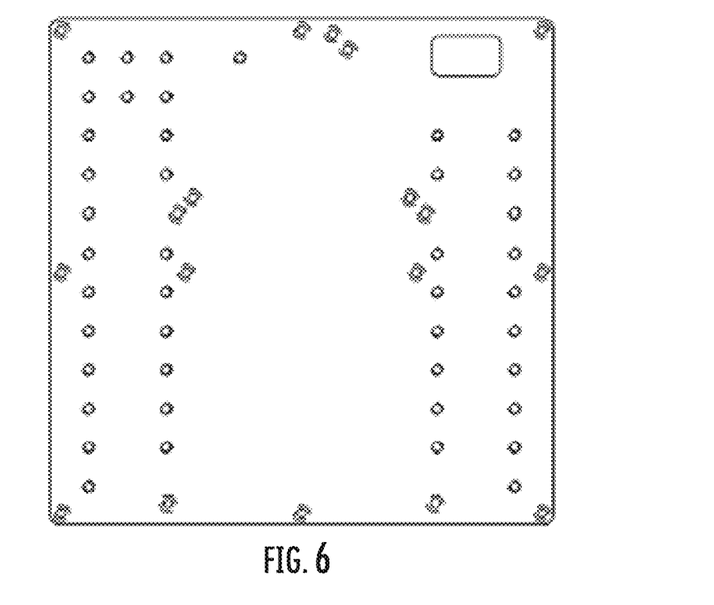

A detailed structure of the plate heater 120 is illustrated in FIGS. 4 to 6.

FIG. 4 is a real photo showing the plate heater, and FIG. 5 illustrates that an internal heat wire is disposed at the center of the plate heater 120. FIG. 6 illustrates a rear surface of the plate heater 120.

Referring to FIGS. 4 to 6, the entire plate may be heated through the heat wire 121 at the center of the plate heater 120, and thread holes 122, detachable rails 123, and bars of equal intervals for installing various attached fixation mechanisms used for each tissue to be imaged may be installed on both sides.

Referring to FIGS. 7 to 10, the detailed structure of the glass heater 110 is configured by coupling the block type heat wire 113 and the glass heater holder 170.

Figure 7:
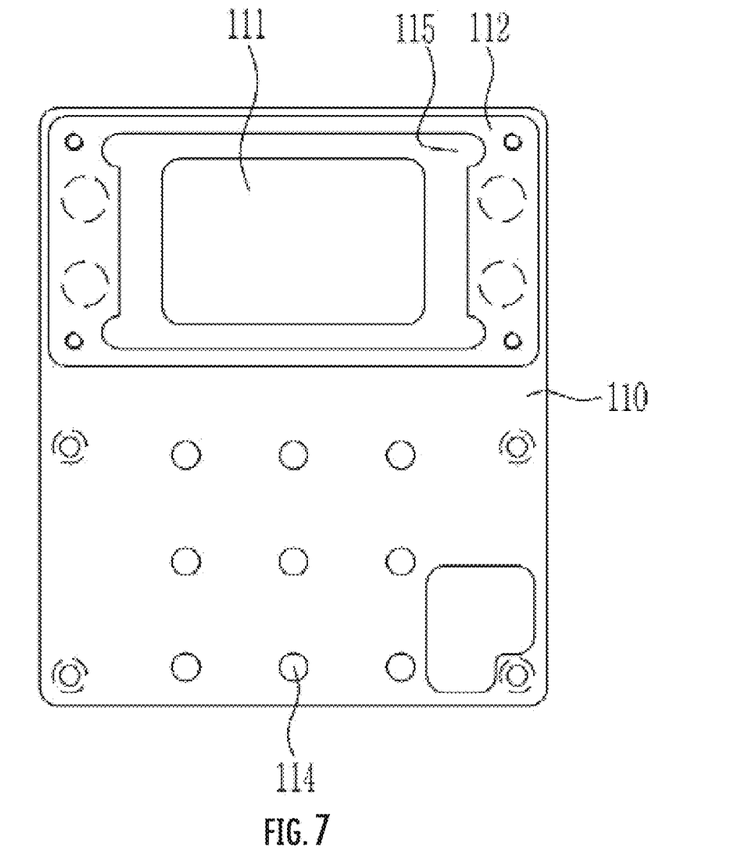
FIGS. 7 to 9 are schematic views of a glass heater component in the fixation and body temperature maintaining apparatus according to an embodiment of the present invention.
Figure 8:
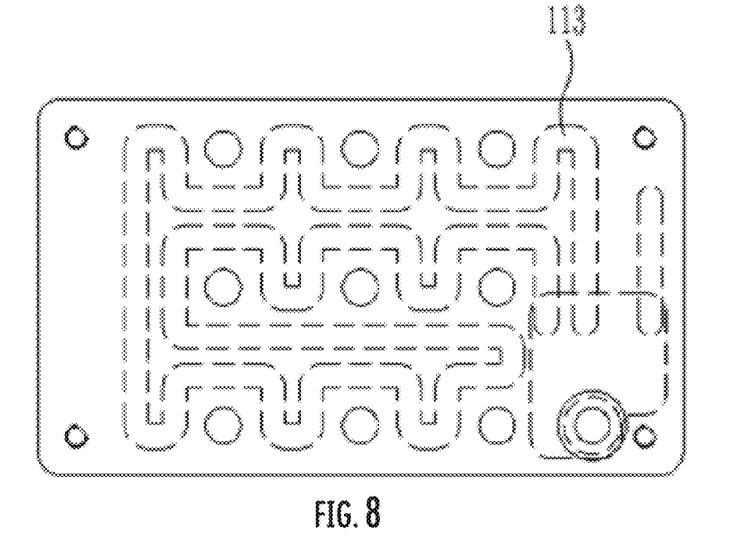
Figure 9:
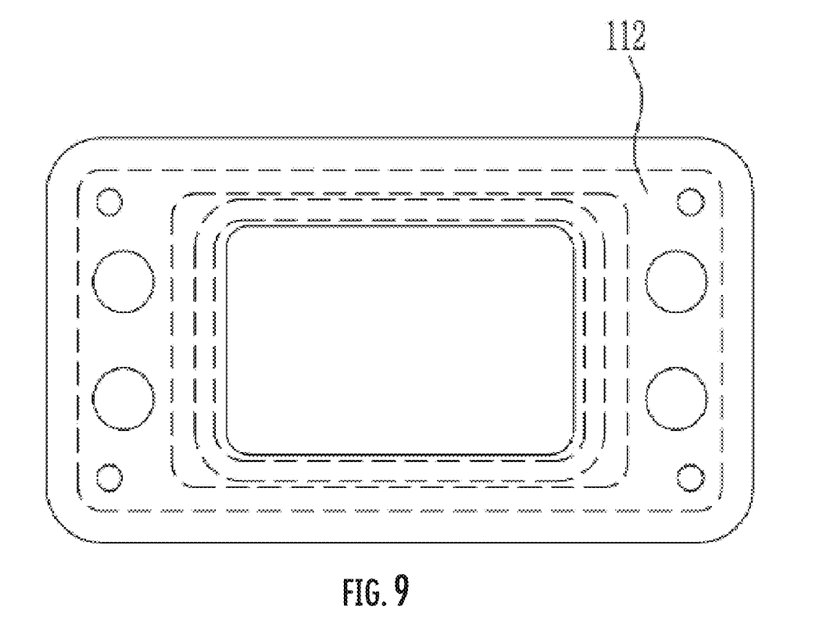

Referring to FIG. 7, a thread hole 114 is disposed at one side of the glass heater holder 170 to fix the glass heater on the side, and referring to FIG. 8 or 9, a groove formed according to the size and the thickness of the cover glass 111 is disposed at the other side, and the glass heater cover 112 fixing the cover glass 111 based on the magnet 117 or the screw 116 is covered to fix the cover glass 111 to the inside.

Figure 10:
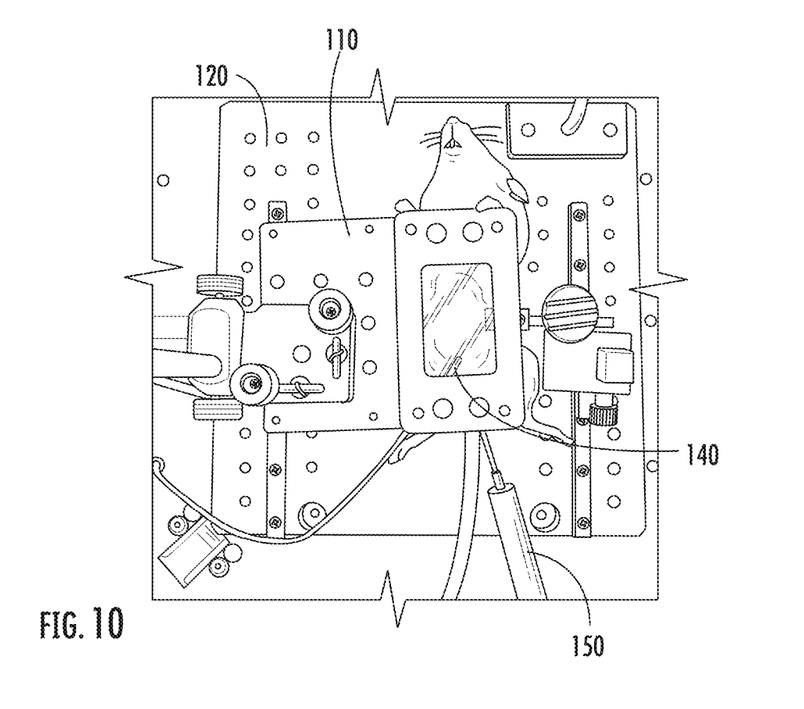
FIG. 10 is a photo in which the plate heater and the glass heater are coupled and actually applied to imaging in a tissue living body in an abdominal cavity in the fixation and body temperature maintaining apparatus according to an embodiment of the present invention.
Figure 11:
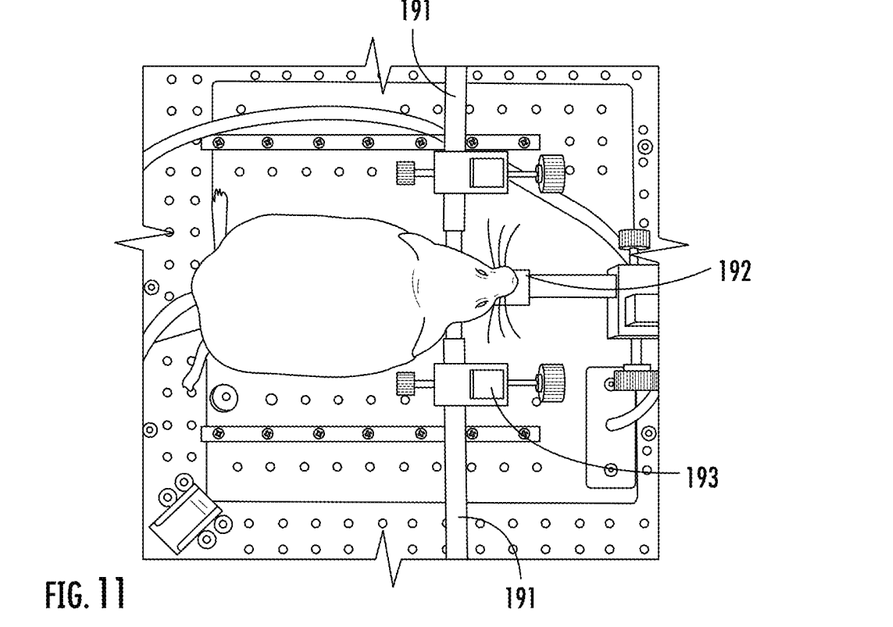
FIG. 11 is a photo of stereotaxic mount coupling applicable to in vivo brain tissue imaging in the fixation and body temperature maintaining apparatus according to an embodiment of the present invention.

Referring to FIG. 10 or 11, attached mechanisms for fixing the animal during imaging in vivo various tissues may largely adopt a stereotaxic mount mechanism for head/brain imaging and a mechanism universally usable for other internal organ imaging.

First, the mechanism for the head/brain imaging is largely constituted by an ear bar 191 fixing an ear, a tooth bar 192 which is a bar fixing a tooth, and a block 193 which is a bar for fixing each bar as illustrated in FIG. 11.

Referring to FIG. 11, the ear is fixed to a skull area of the small animal (300) model by the ear bar 191, and the ear bar 191 is fixed by the block 193. Further, the protruded tooth is fixed by the tooth bar 192. Therefore, in the present invention, three points are fixed to minimize movement of a skull portion. The stereotaxic mount may be used for the purpose of fixing the head and a body of the small animal 300 may be fixed by a separate attached product.

Figure 12:
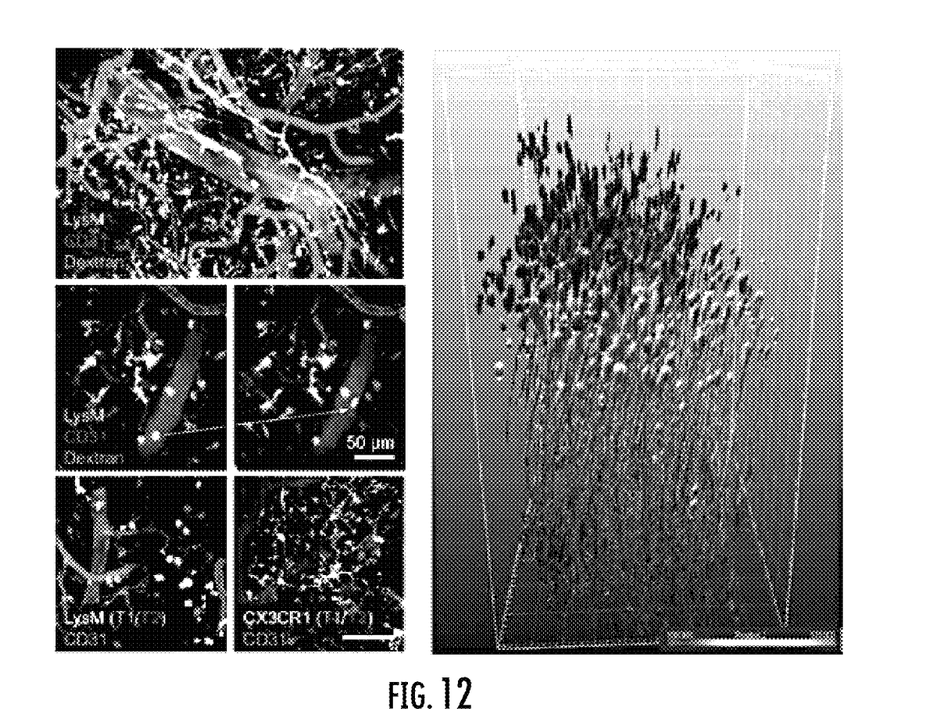
FIG. 12 is a diagram illustrating an in vivo brain tissue imaging result to which a body temperature maintaining system and stereotaxic mount in the fixation and body temperature maintaining apparatus according to an embodiment of the present invention.

Referring to FIG. 12, a result example of acquiring a high-resolution fluorescent image in the animal model by actually applying the stereotaxic mount to the body temperature maintaining apparatus for small animal (300) in vivo imaging is described.

Vascular endothelial cells are fluorescently dyed based on CD31 antibodies in LysM-GFP and CX3CR1-GFP mice manifesting a fluorescent protein in immune cells, and Dextrain coupled polymer fluorescent materials are injected and flow inside the blood vessels to fluorescently image a blood flow.

As such, the small animal 300 may be fixed and the body temperature of the small animal 300 may be maintained through the fixation and body temperature maintaining apparatus 10 acquire an in vivo high-resolution fluorescent image in the skull portion of the small animal 300 through a microscope device (not illustrated). In particular, both body temperature maintaining and imaging tissue fixation are conducted to acquire the high-resolution fluorescent image in the skull portion.

Figure 13:
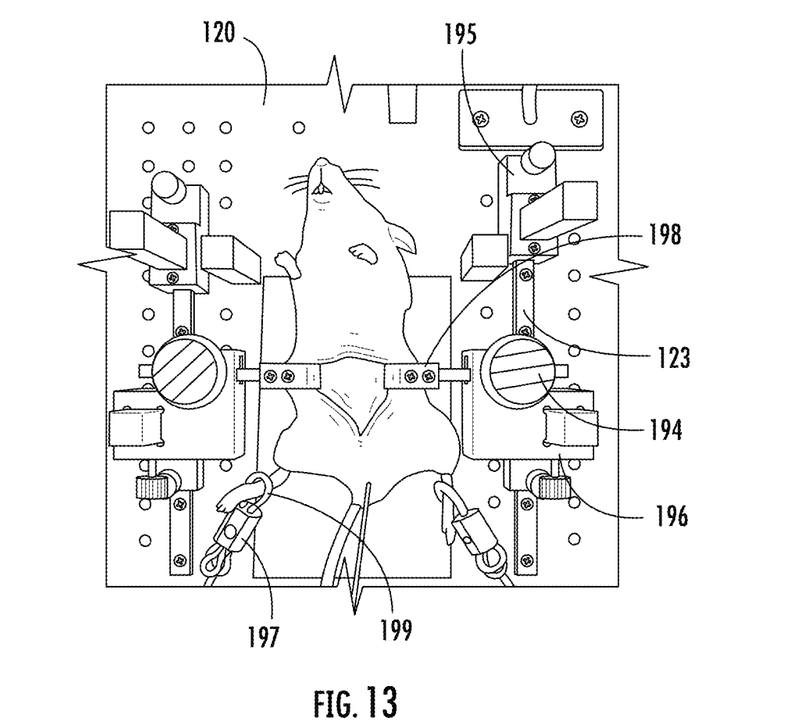
FIG. 13 is a photo in which a rodent is fixed and an imaging tissue is exposed by coupling a retractor in the fixation and body temperature maintaining apparatus according to an embodiment of the present invention.

Referring to FIG. 13, a mechanism universally usable for other internal organ imaging is constituted by a rail 123 fixed to the plate heater 120, a movable bar (Rail Block & Bar) 195 installed on the rail 123 fixed to the plate heater 120, a tissue retractor 198 and a retractor fixation holder (Hook & Hook holder) 195, and a ring type wire 199 capable of fixing a lower body, and a holder 197.

A retractor 198 that holds a skin tissue after incision is required to stably exposure the internal organ, and for a position of the retractor, upper and lower, and left and right portions, and a height are arbitrarily controllable according to the position of the organ to be image.

In order to achieve this, the bar 195 may be fixed onto the rail 123 (upper and lower portions), the retractor fixation holder 196 may be fixed to the bar 195 (height), and the retractor 198 may be fixed by using a hand screw 194 (left and right portions).

Further, the wire holder 197 may fix a wire 199 by a spring scheme so as to fix a foot by using a tension of the wire for posture fixation of the small animal 300 in addition to skin tissue fixation through the retractor 198.

Figure 14:
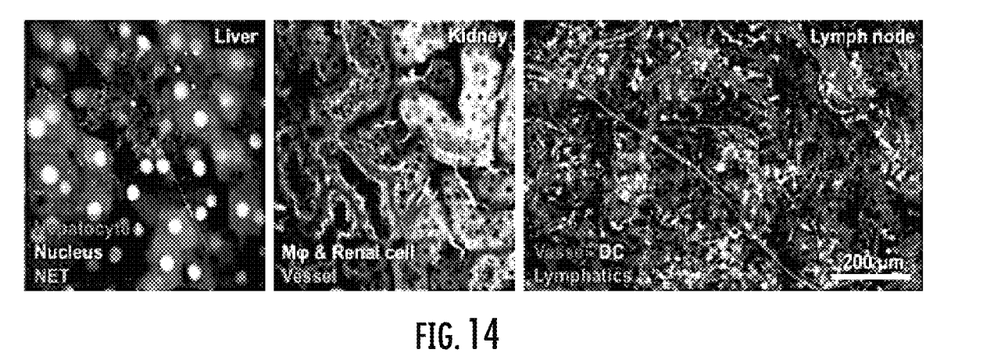
FIG. 14 is a diagram illustrating a high-resolution/large-area imaging result of various living body tissues acquired by coupling the plate heater and the glass heater to an XYZ translational stage of a biomicroscope in the fixation and body temperature maintaining apparatus according to an embodiment of the present invention.
Figure 15:
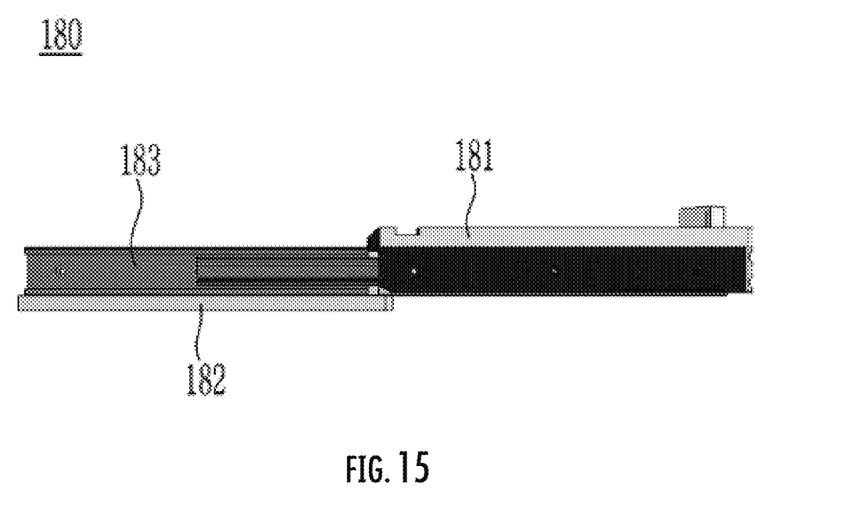
FIGS. 15 to 18 are diagrams illustrating a sliding plate holder device in the fixation and body temperature maintaining apparatus according to an embodiment of the present invention.
Figure 16:
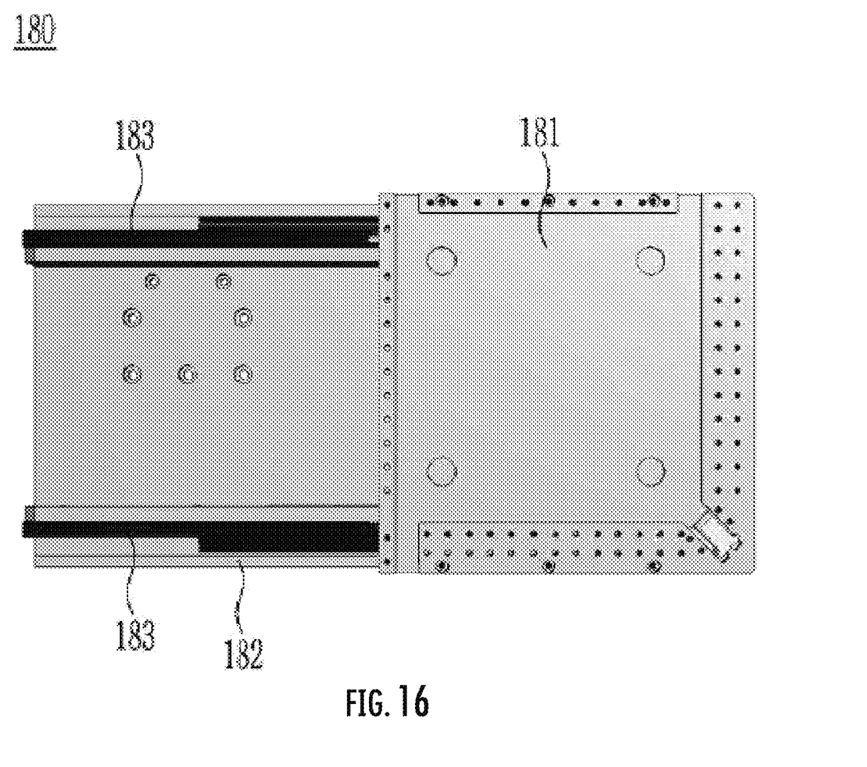
Figure 17:
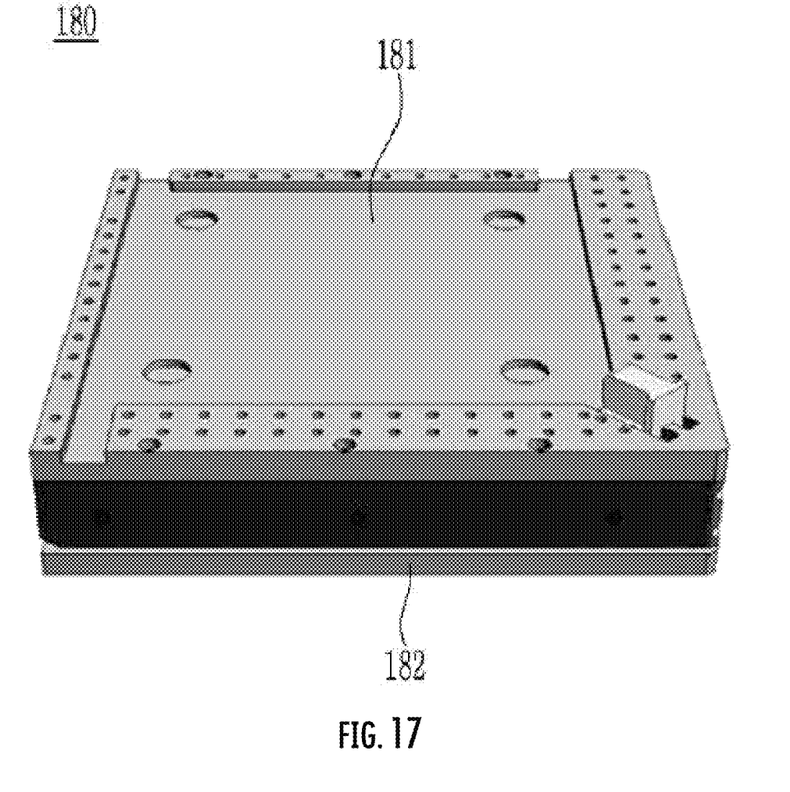
Figure 18:
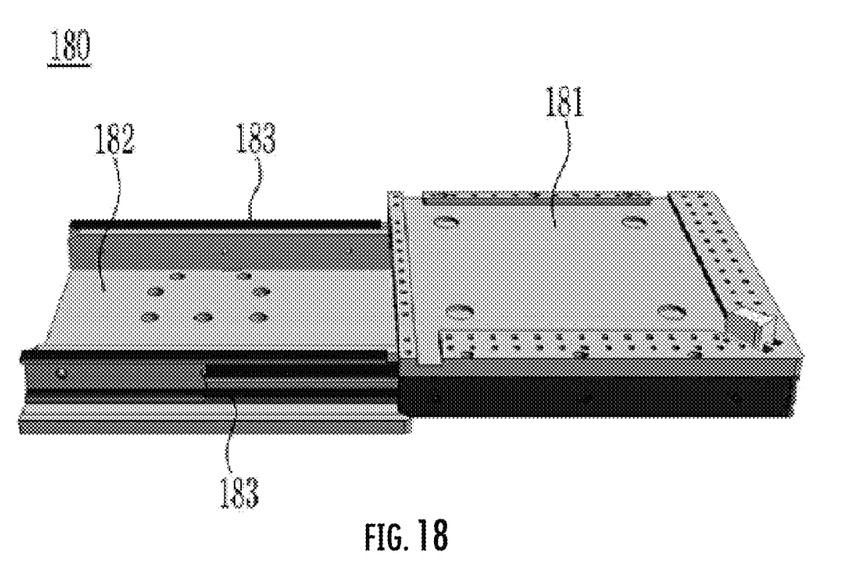

As illustrated in FIG. 14, a universal mouse fixation apparatus is actually applied to the animal fixation and body temperature maintaining apparatus 10 to acquire the high-resolution fluorescent image in the tissue in an abdominal cavity of the animal model.

In addition, in the liver of the live mouse model, hepatocytes and cell nucleus may be subjected to high-resolution in vivo fluorescent imaging based on the fluorescent protein and neutrophil extracellular traps may be subjected to high-resolution in vivo fluorescent imaging by antibody based dyeing method, and in the kidney, blood vessels may be subjected to high-resolution in vivo fluorescent imaging by fluorescent protein based immune cells, spontaneous fluorescent based kidney cells, and antibody-based dyeing method. Further, in lymph nodes of the mouse, blood vessels and lymphatic vessels may be subjected to high-resolution large-area imaging by immune cells and antibody based dyeing method based on the fluorescent protein.

Further, the embodiment of the present invention generally includes a body temperature maintaining function and attached fixation mechanism in small animal (300) in vivo imaging directly used for exposing the tissue so as to maintain the homeostasis of the small animal 300 and achieve in vivo imaging of the small animal 300, and a sliding type plate heater 120 capable of conveniently locating the corresponding mechanism below the object lens of the biomicroscope.

Referring to FIGS. 15 to 18, the glass heater 110 and the attached fixation mechanisms are all positioned above the plate heater 120. The plate heater 120 may be easily attached to/detached from the sliding plate holder device 180 by using a spring type fixation device. A fixation groove formed according to the specification of the plate heater 120 is installed at an upper end portion of the sliding plate holder device 180. The spring type fixation device is installed in a diagonal direction below a left side so as to be fixed to three surfaces in the groove. The sliding plate heater holder 181 is fixed and slidable to the stage 182 by using the rail 183.

Further, the groove may be formed on the side of the rail 123 so as to easily remove the body temperature maintaining and fixation mechanism fixed to the rail 123 on the plate heater 120.

Figure 19:
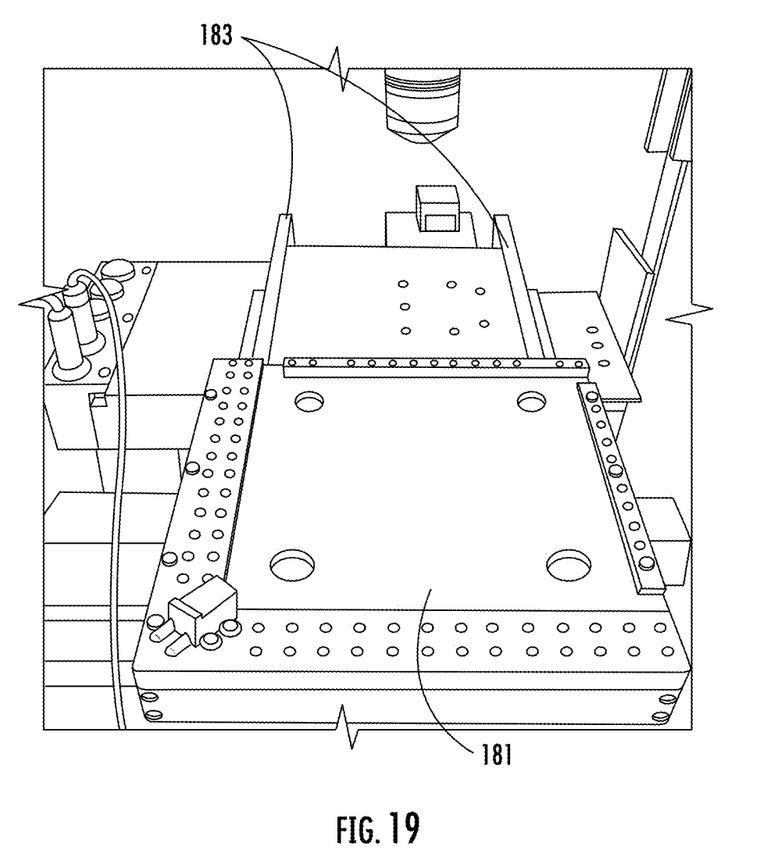
FIG. 19 is a photo in which the sliding plate holder is moved to an outermost portion so as to facilitate plate holder mounting and small animal fixation in the fixation and body temperature maintaining apparatus according to an embodiment of the present invention.

Further, FIG. 19 illustrates a photo in which the sliding plate holder 181 is moved to the outermost portion of the stage. Since the sliding plate holder protrudes to the outside, the plate heater is attached/detached and the small animal is fixedly easily without an obstacle such as the microscope or lens thereon.

Figure 20:
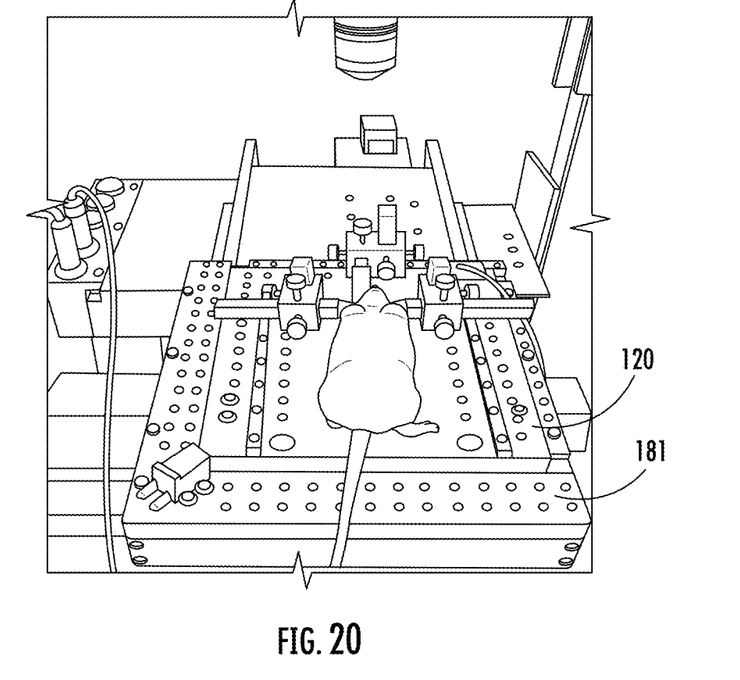
FIG. 20 is a photo in which the plate heater on which an animal goes up is detachably fixed to the sliding plate holder in the fixation and body temperature maintaining apparatus according to an embodiment of the present invention.

Actually, FIG. 20 illustrates a photo in which the plate heater 120 on which the small animal goes up is detachably fixed to the slide plate holder device 180.

Figure 21:
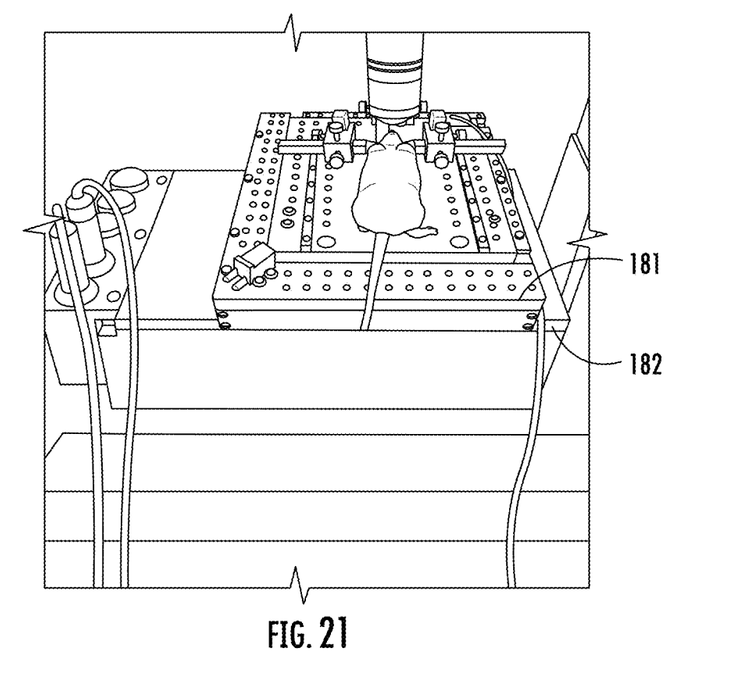
FIG. 21 is a photo in which the sliding plate holder to which the plate heater is fixed is moved to an imaging focus region below an object lens in the fixation and body temperature maintaining apparatus according to an embodiment of the present invention.

In this state, when the plate holder is pushed and slid, a state illustrated in FIG. 21 is shown.

Referring to FIG. 21, the sliding plate heater 120 to which the plate heater 120 is slid and moved to the imaging focus region below the object lens. In this state, a user is capable of arbitrarily observing the small animal 300.

In the embodiment of the present invention, the body temperature of the live small animal 300 which is the object to be observed with the biomicroscope is maintained to be constant.

Further, in the embodiment of the present invention, the small animal 300 is stably fixed and the small animal is easily observed.

Further, in the embodiment of the present invention, it is possible to stably and conveniently perform high-resolution micro imaging while maintaining the homeostasis of various tissues of the live small animal 300 by applying a sliding type stage for smoothly moving a sample plate to which the small animal 300 is fixed to a focus region of the biomicroscope.

Further, in the embodiment of the present invention, the apparatus includes a device that maintains the body temperature of the small animal 300, and exposes the organ by fixing the small animal 300 and a tissue, and a stage upper plate capable of moving the corresponding device to the microscope focus region to maintain the homeostasis of an animal model and more easily access internal and external organs, thereby enhancing user accessibility to in vivo imaging. That is, an in vivo imaging environment of which an individual existing researcher takes charge is constructed in terms of hardware/software, so micro imaging for various tissues of the small animal 300 can be effectively utilized for a research that identifies various disease or biological phenomena which occur in the animal model.

The embodiments of the present invention are not limited to the above-described apparatus and method, but may be implemented through a program for implementing functions corresponding to the configuration of the embodiment of the present invention, a recording medium on which the program is recorded, and the like and the present invention can be easily implemented by those skilled in the art from the description of the embodiments described above.

Although the embodiment of the present invention has been described in connection in detail, it is to be understood that the scope of the present invention is not limited to the disclosed embodiments, but, on the contrary, is intended to cover various transforms and modifications of those skilled in the art arrangements included using the basic concept of the present invention defined the appended claims.

What is claimed is:

1. A fixation and body temperature maintaining apparatus for fixing a small animal in order to generate a high-resolution micro image of a predetermined tissue of the small animal within a biomicroscope with an object lens, comprising:
   a plate heater with a heat wire installed therein, on which the small animal is enabled to be directly placed;
   a glass heater holder fixed to a hole of the plate heater; and
   a glass heater fixed to the glass heater holder, and located above the tissue of the small animal and maintaining flatness of the tissue, and increasing a temperature of the tissue itself,
   wherein the glass heater comprises a cover glass serving to adjust a refractive index of the object lens, a glass holder fixing the cover glass, a glass holder cover, and a heat wire heater, and
   the glass holder and the heat wire heater are integrally formed, and the glass holder and the glass holder cover are enabled to be separated from each other and fixed by using a screw and a magnet.

2. The fixation and body temperature maintaining apparatus of claim 1, further comprising:
   a tissue temperature sensor sensing the temperature of a biological tissue in the small animal;
   a body temperature sensor sensing a body temperature of the small animal;
   a plate temperature sensor measuring a current temperature of the plate heater;
   a glass temperature sensor measuring the current temperature of the glass heater; and
   a control device receiving outputs of the tissue temperature sensor, the body temperature sensor, the plate temperature sensor, and the glass temperature sensor, and driving the plate heater so that the current temperature of the body temperature sensor reaches a maintenance target body temperature, and driving the glass heater so that the tissue temperature becomes a target tissue temperature.

3. The fixation and body temperature maintaining apparatus of claim 1, wherein the heater wire is installed at a center of the plate heater, and holes with threads of an equal interval for installing attached fixation mechanisms used for each of tissues to be imaged are formed on both sides of the plate heater.

4. The fixation and body temperature maintaining apparatus of claim 1, wherein detachable rails and bars are installed on both sides of the plate heater.

5. The fixation and body temperature maintaining apparatus of claim 1, wherein the glass heater is configured by coupling a block type heat wire heater and the glass holder, and
   the thread is disposed at one side of the glass holder to fix the glass heater by using the glass heater holder and a groove formed according to a size and a thickness of the cover glass is disposed at the other side of the glass holder, and a glass heater cover fixing the cover glass is covered based on a magnet or a screw to fix the cover glass to the inside of the glass holder.

6. The fixation and body temperature maintaining apparatus of claim 1, further composing:
   a 3-axis stage upper plate,
   the sliding plate holder capable of detachably fixing a body temperature maintaining and fixing mechanism is coupled to the 3-axis stage upper plate.

7. The fixation and body temperature maintaining apparatus of claim 1, wherein the plate heater is fixed to a sliding plate holder with the rail to be slid and taken out to the outside of the stage.

* * * * *